UNITED STATES PATENT OFFICE 2,375,015

STABILIZATION OF UNSATURATED NITRILES

Kenneth E. Marple, Oakland, and Bert Borders, San Francisco, Calif., assignors to Shell Development Company, San Francisco, Calif., a corporation of Delaware No Drawing. Application March 26, 1943, Serial No. 480,720

9 Claims. (Cl. 260—464)

This invention relates to a method for preventing or inhibiting the autopolymerization of unsaturated nitriles and to the novel compositions of matter resulting from application of such method. The invention is of particular value as applied to the stabilization of alpha-beta unsaturated nitriles, i. e. unsaturated nitriles, such as acrylonitrile and methacrylonitrile, in which the carbon atoms linked by the double bond are in alpha-beta relation to the carbon atom to which the nitrogen atom is attached.

Acrylo- and methacrylo-nitriles are compounds of great utility, being particularly adapted for use in the manufacture of synthetic rubbers. The synthetic rubber Buna-N, for example, is a co-polymer of acrylonitrile and butadiene, while a product superior to Buna-N in many respects can be prepared according to co-pending application, Serial Number 464,288, by co-polymerizing acrylonitrile with butadiene and a methylpentadiene.

In the preparation of synthetic rubbers using acrylonitrile, it is of utmost importance that the acrylonitrile be employed only in the form of its monomer, otherwise an unsatisfactory product invariably results. This requirement is exceedingly difficult to meet, particularly when the acrylonitrile after its preparation must be stored or shipped prior to use since compounds of this type rapidly polymerize under storage and shipping conditions.

Many of the inhibitors which have been heretofore proposed to suppress the polymerization of alpha-beta unsaturated nitriles are unsatisfactory either because of the large quantity of inhibitor which must be added or because of difficulties incident to the removal of the inhibitor after it has served its purpose. Other commonly used inhibitors have been found to actually increase rather than to retard the polymerization of these compounds.

The inhibitors provided by the present invention are effective in low concentration and in many cases it is unnecessary to seperate the inhibitor prior to use of the nitrile. Where, however, separation of the inhibitor is considered desirable, it is easily accomplished, usually by acid treatment followed by distillation.

According to the invention the autopolymerization of unsaturated nitriles, particularly alpha-beta unsaturated nitriles, is effectively suppressed by mixing therewith a relatively small amount of an unsaturated amine. The unsaturated amine may be primary, secondary, tertiary, or quaternary, or a mixture comprising two or more of these may be employed. Also it is possible to use an unsaturated amine, the hydrocarbon radicals of which, are different, or an unsaturated amine containing a plurality of amino groups. A compound employed as an inhibitor according to the invention may comprise part of either an acyclic or alicyclic structure. In either event, one or more hydrogen atoms may be substituted with other hydrocarbon radicals which may be aromatic or heterocyclic as well as acyclic or alicyclic radicals. Examples of suitable amines applicable to the practice of the invention include: allyl amine, methallyl amine, crotyl amine, 3-amino-butene-1, 4-amino-butene-1, 3-amino-2-methyl-butene-1, 2,5-diamino-hexene-3, 2,4-diamino-butene-2, diallyl amine, triallyl amine, dimethallyl amine, trimethallyl amine, monoallyl dibutyl amine, mono-butyl dimethallyl amine, benzyl diallyl amine, N-mono-allyl aniline, N-allyl alpha napthyl amine, etc.

The inhibitors provided by the invention may be employed to prevent the autopolymerization of unsaturated nitriles not only during shipment and storage but also under other circumstances as during the separation of an unsaturated nitrile from a reaction mixture containing it.

The invention is applicable to the stabilization of any unsaturated nitriles falling within the general formula:

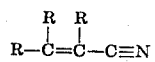

wherein R may be a hydrogen atom or an alkyl, aryl, aralkyl, alkenyl, aralkenyl, alicyclic or heterocyclic radical which itself may contain substituent groups or elements. Among the many unsaturated nitriles in addition to acrylonitrile and methacrylonitrile which may be stabilized may be mentioned: crotonitrile, α-ethyl acrylonitrile, α-propyl acrylonitrile, α-β-dimethyl acrylonitrile, β-ethyl acrylonitrile, α-phenyl acrylonitrile, α-naphthyl acrylonitrile, etc.

Although the proportion or amount of inhibitor which is added to suppress the polymerization of unsaturated nitriles according to the invention and to produce the novel compositions of matter encompassed thereby may vary within wide limits, it is preferred to add the smallest effective amount. This is usually between about 0.1% and about 2% by weight depending inter alia upon the degree of instability of the particular nitrile being prepared for shipment or storage, the period over which the nitrile must be preserved, and the particular inhibitor which is being used.

The inhibitor may be added following final purification of the unsaturated nitrile or, as before indicated, at some stage during the preparation or purification of the nitrile. When it is added to a reaction mixture from which the nitrile is to be separated by distillation the boiling point of the inhibitor most preferably approximates that of the nitrile. The conditions of the distillation should not, of course, be such as to destroy or inactivate the inhibitor.

While the inhibitor is referred to as being added to a reaction mixture containing the unsaturated nitrile, it is to be understood that in some instances the inhibitor may already be present in the reaction mixture. In this event the separation may be carried out without adding additional inhibitor and as in the case where the inhibitor is added to the reaction mixture under such conditions that a stabilizing amount of the inhibitor is left present in the final nitrile product.

The invention is most preferably practiced using as the inhibitor an unsaturated amine, the molecular structure of which conforms to that of the unsaturated nitrile which is to be stabilized. Thus acrylonitrile, $CH_2=CH-CN$, is preferably stabilized with allyl amine, $CH_2=CH-CH_2NH_2$, while methallylamine,

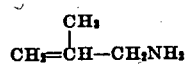

is preferably used in the stabilization of methacrylonitrile,

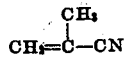

The presence of small quantities of allyl amine in acrylonitrile does not appear to inhibit its co-polymerization with butadiene hydrocarbons, nor does the presence of methallyl amine in the reaction mixture during the co-polymerization of methacrylonitrile with butadiene appear to have any adverse effect. Thus, polymer yields equivalent to those obtained using purified methacrylonitrile have been achieved with methacrylonitrile containing 0.1% by weight primary methallyl amine. This amount of methallyl amine, as will be subsequently shown, is sufficient to stabilize methacrylonitrile over long periods.

As stated, removal of the inhibitor is easily accomplished when considered desirable by acid treatment followed by distillation. The acid treatment is usually carried out using a dilute mineral acid (5–10%) such as HCl or $H_2SO_4$. The treatment results in the formation of a water soluble salt of the amine which is readily separated from the nitrile by water washing. Distillation of the residual mixture yields a fraction containing the nitrile together with some water, which may be separated by drying or redistillation.

The autopolymerization of unsaturated nitriles is accelerated by heat and by exposure to light, consequently the worth of a particular substance in the stabilization of these compounds is best shown under the influence of one or both of these agencies.

*Example I*

A bottle of freshly prepared acrylonitrile containing no inhibitor was placed on the laboratory roof exposed to the sunlight. After eight days the sample was completely solid.

A second bottle of acrylonitrile to which had been added 0.1% of allyl amine did not show the formation of any polymer until eighteen days had elapsed and did not become completely solid until after twenty-two days.

*Example II*

Samples of acrylonitrile prepared by the dehydration of ethylene cyanohydrin and the oxidation of allyl amine were irradiated with an ultra-violet lamp (General Electric Mazda A–H–4 with outside glass jacket removed). The samples were placed approximately 1½ feet from the light source. In each case polymer formation was noted in from two to seven days.

Samples of acrylonitrile prepared as above but to which had been added about 0.1% of allyl amine were irradiated with the same lamp mounted as before approximately 1½ feet from the samples. There was no polymer formation after fifty-eight days.

*Example III*

Small samples of methacrylonitrile with and within inhibitor (methallyl amine) were exposed to the influence of ultra-violet light. The light source was the lamp of the foregoing tests which was placed in this instance about 1 foot from the samples. In the uninhibited samples polymer developed in five days and the samples were completely solid at the end of twenty days. The addition of 0.1% of methallyl amine inhibited the polymerization of the methacrylonitrile to the extent that the first polymer was noticeable only after sixty-five days and even after eighty-seven days only about 20% of the sample had polymerized. The addition of 1% methallyl amine gave a darkening in color of the nitrile not noticed with the smaller amount and a show of polymer in eleven days. However, complete polymerization had not occurred in eighty-seven days.

We claim as our invention:

1. The method of inhibiting the autopolymerization of acrylonitrile which comprises incorporating therewith about 0.1% of allyl amine.

2. The method of inhibiting the autopolymerization of methacrylonitrile which comprises incorporating therewith about 0.1% of methallyl amine.

3. The method of inhibiting the autopolymerization of acrylonitrile which comprises incorporating therewith about 0.1% to about 2% of an alpha-beta unsaturated amine.

4. The method of inhibiting the autopolymerization of methacrylonitrile which comprises incorporating therewith about 0.1% to about 2% of an alpha-beta unsaturated amine.

5. The method of inhibiting the autopolymerization of a nitrile selected from the group consisting of acrylonitrile and alpha-substituted acrylonitriles in which the substituent is a lower alkyl radical, which comprises incorporating therewith about 0.1% to about 2% of the corresponding alpha-beta unsaturated amine.

6. The method of inhibiting the autopolymerization of a nitrile selected from the group consisting of acrylonitrile and alpha-substituted acrylonitriles in which the substituent is a lower alkyl radical, which comprises incorporating therewith a stabilizing amount of an alpha-beta unsaturated amine.

7. As a composition of matter acrylonitrile containing a stabilizing quantity of allyl amine dissolved therein.

8. As a composition of matter methacrylonitrile containing a stabilizing quantity of methallyl amine dissolved therein.

9. As a composition of matter a nitrile selected from the group consisting of acrylonitrile and alpha-substituted acrylonitriles in which the substituent is a lower alkyl radical, and a stabilizing amount of an alpha-beta unsaturated amine dissolved in said nitrile.

KENNETH E. MARPLE.
BERT BORDERS.